United States Patent [19]
Horiuchi

[11] Patent Number: 6,035,693
[45] Date of Patent: Mar. 14, 2000

[54] SYSTEM FOR DETECTING ABNORMALITY OF YAW RATE SENSOR AND LATERAL ACCELERATION SENSOR

[75] Inventor: Yutaka Horiuchi, Wako, Japan

[73] Assignee: Honda Giken Kogyo Kabushiki Kaisha, Tokyo, Japan

[21] Appl. No.: 09/138,530

[22] Filed: Aug. 24, 1998

[30] Foreign Application Priority Data

Sep. 2, 1997 [JP] Japan ..................... 9-236643

[51] Int. Cl.$^7$ ........................................ B60T 8/32
[52] U.S. Cl. ............................................. 73/1.37
[58] Field of Search .................... 73/1.37, 1.79

[56] References Cited

U.S. PATENT DOCUMENTS 5,219,212  6/1993  Shimada et al. .

*Primary Examiner*—Robert Raevis
*Attorney, Agent, or Firm*—Armstrong, Westerman, Hattori, McLeland & Naughton

[57] ABSTRACT

Abnormality of a yaw rate sensor, including a state in which the neutral point is normal, but the sensitivity is abnormal, is detected with high accuracy, irrespective of the situation of a road surface traveled. A lower one of an output from a dividing device for dividing a vehicle speed detected by the vehicle speed detecting device by a minimum radius of turning of a vehicle and an output from a dividing device for dividing a gravitational acceleration by the vehicle speed detected by the vehicle speed detecting device, is selected in a low-select device. It is determined in an abnormality determining device that the yaw rate sensor is abnormal when a yaw rate detected by the yaw rate sensor exceeds a value selected in the low-select device.

1 Claim, 8 Drawing Sheets

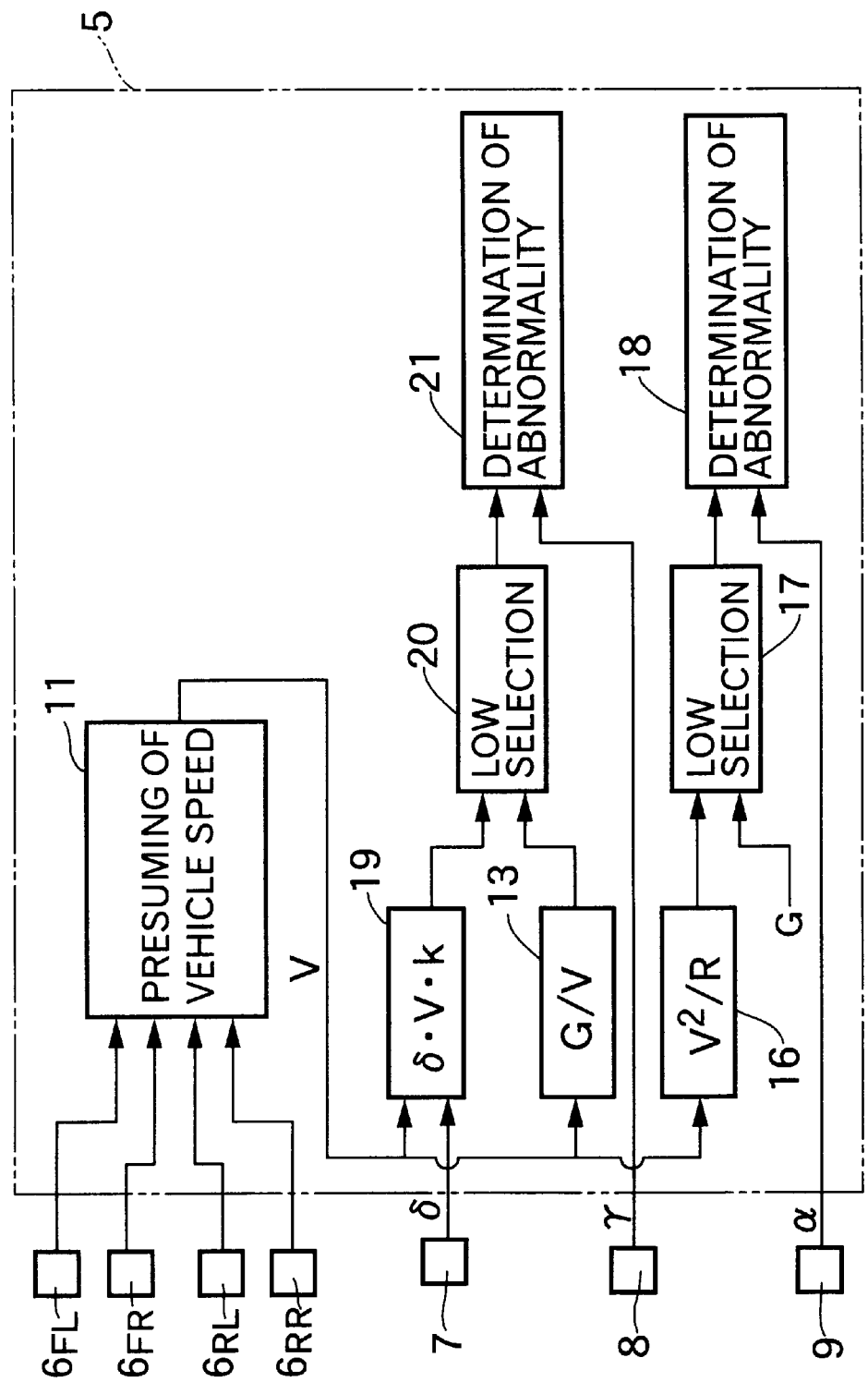

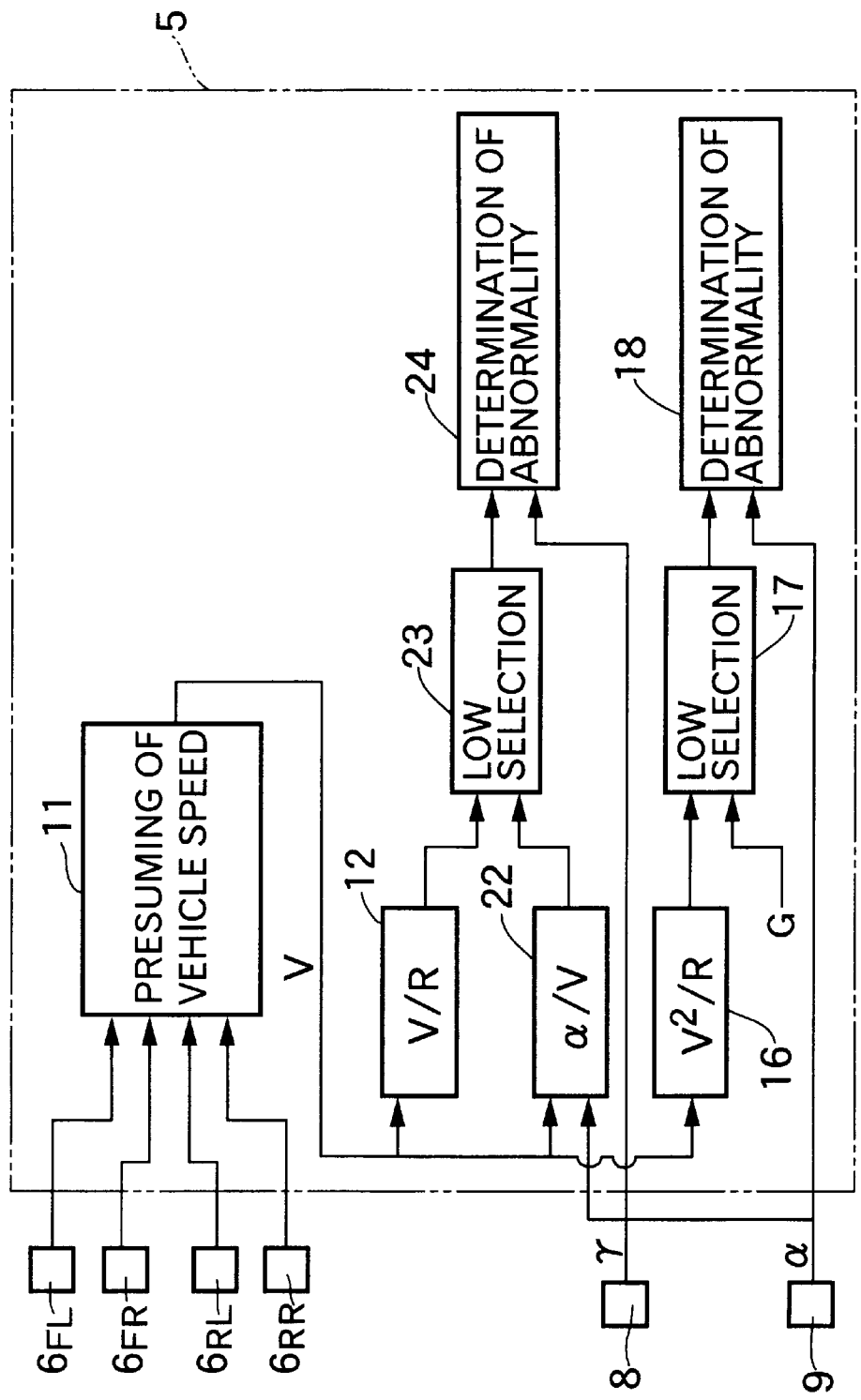

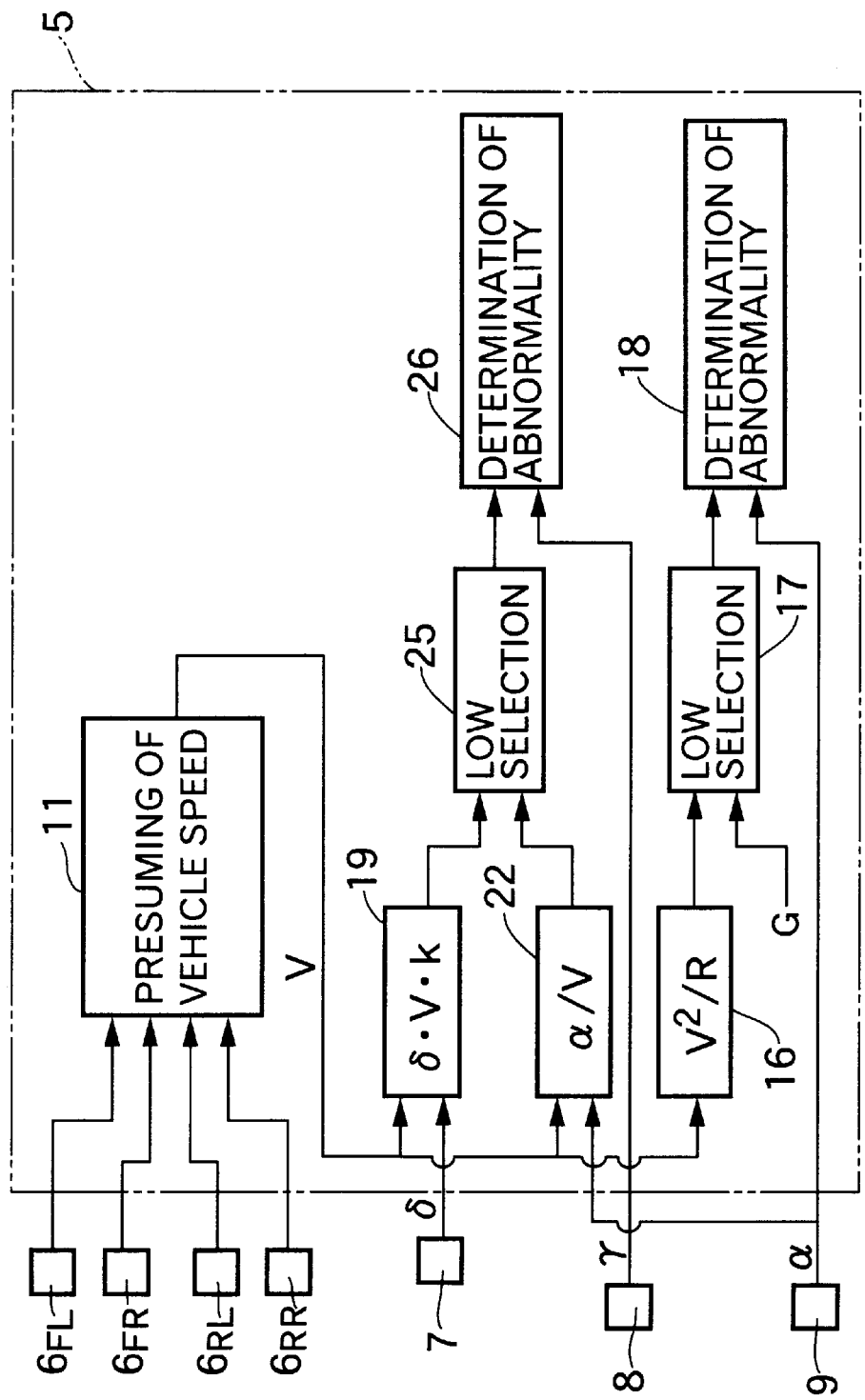

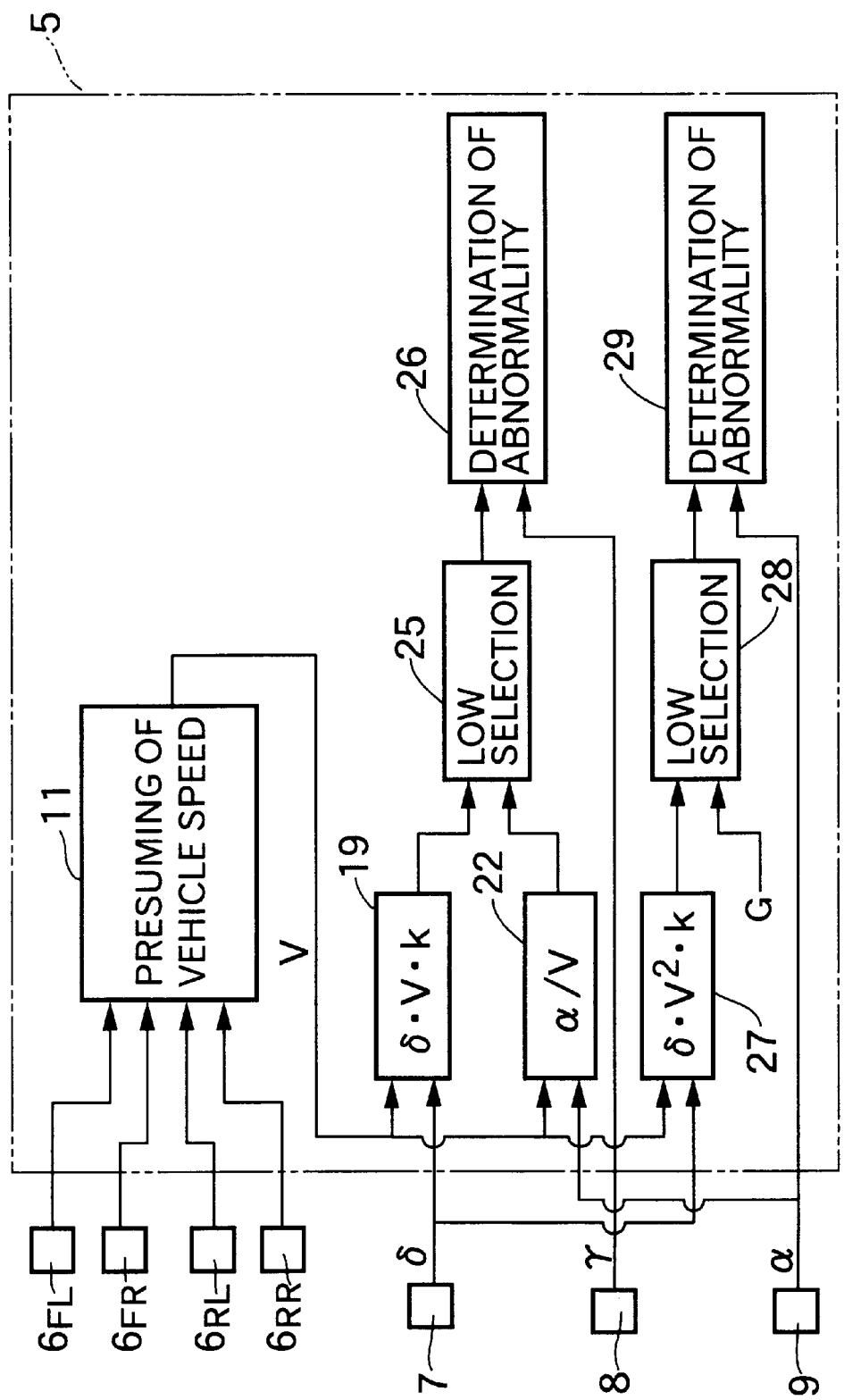

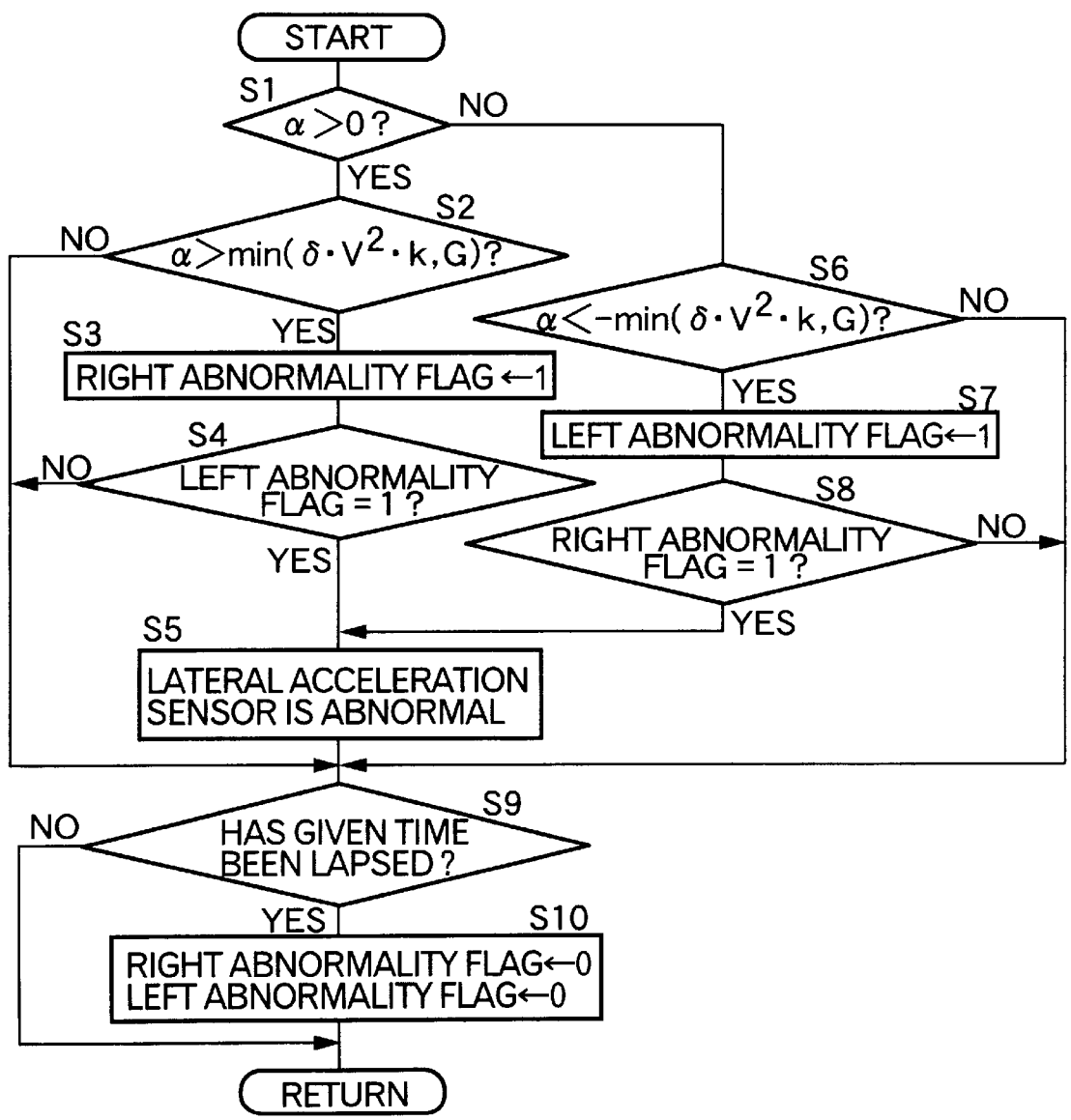

SYSTEM FOR DETECTING ABNORMALITY OF YAW RATE SENSOR AND LATERAL ACCELERATION SENSOR

BACKGROUND OF THE INVENTION

1. Field of the Invention

The present invention relates to a system for detecting an abnormality of a yaw rate sensor for detecting a yaw rate of a vehicle, and a system for detecting an abnormality of a lateral acceleration sensor for detecting a lateral acceleration of the vehicle.

2. Description of the Related Art

To detect the abnormality of the yaw rate sensor, it is a conventional practice to determine that the yaw rate is abnormal when the value detected by the yaw rate sensor exceeds an upper limit value or a lower limit value, and to determine the abnormality of the yaw rate sensor by comparison of the yaw rate presumed from a difference between left and right wheel speeds with the value detected by the yaw rate sensor.

In the technique for determining whether the yaw rate sensor is abnormal based on whether the value detected by the yaw rate sensor exceeds the upper or lower limit value, it is impossible to detect a state in which the neutral point of the yaw rate sensor is normal, but the sensitivity is abnormal. In the technique for determining whether the yaw rate sensor is abnormal by the comparison of the yaw rate presumed from a difference between the left and right wheel speeds with the value detected by the yaw rate sensor, the yaw rate presumed from the difference between the left and right wheel speeds is inaccurate when the vehicle is traveling on a rough road or on a road surface having a low friction coefficient, on which the wheel is liable to slip. For this reason, it is impossible to determine the abnormality of the yaw rate sensor with good accuracy.

SUMMARY OF THE INVENTION

The present invention has been accomplished with such circumstance in view, and it is a first object of the present invention to provide a system for detecting an abnormality of a yaw rate, wherein the abnormality of a yaw rate sensor, including a state in which the neutral point of the yaw rate sensor is normal, but the sensitivity is abnormal, can be detected with good accuracy, irrespective of the situation of a road surface traveled. It is a second object of the present invention to provide a system for detecting an abnormality of a lateral acceleration sensor, wherein the abnormality of the lateral acceleration sensor can be detected with good accuracy, based on the measure enabling the abnormality of the yaw rate sensor to be detected with good accuracy.

To achieve the first object, there is provided a system for detecting an abnormality of a yaw rate sensor, comprising a vehicle speed detecting means for detecting a vehicle speed of a vehicle, a dividing means for dividing the vehicle speed detected by the vehicle speed detecting means by a minimum turning radius of the vehicle, a dividing means for dividing a gravitational acceleration by the vehicle speed detected by the vehicle speed detecting means, a low-select means for selecting a lower one of outputs from both of the dividing means, and an abnormality determining means for determining that a yaw rate sensor is abnormal when the yaw rate detected by the yaw rate sensor exceeds a value selected by the low-select means.

When there is no side-slip of the vehicle, the yaw rate γ of the vehicle must be within an obliquely-lined range shown in FIG. 3 depending upon a limit value of centripetal acceleration of the vehicle, i.e., the gravitational acceleration G and a lower limit value of the radius of turning of the vehicle, i.e., the minimum turning radius R. If the vehicle speed is represented by V, the yaw rate γ of the vehicle capable of being generated must be in a range of $\gamma \leq \min\{(V/R), (G/V)\}$. Therefore, when the yaw rate γ is in a range which exceeds lower one of a value (V/R) obtained by dividing the vehicle speed V by the minimum radius R of turning of the vehicle and a value (G/V) obtained by dividing the gravitational acceleration G by the vehicle speed V, i.e., which exceeds $\min\{(V/R), (G/V)\}$, the side-slip of the vehicle is nearly "0" in a usual traveling state of the vehicle. Therefore, the abnormality of the yaw rate sensor, including the state in which the neutral point is normal, but the sensitivity is abnormal, can be detected with good accuracy, irrespective of the situation of the road surface traveled.

To achieve the first object, there is also provided a system for detecting an abnormality of a yaw rate sensor, comprising a vehicle speed detecting means for detecting a vehicle speed of a vehicle, a steering angle sensor for detecting a steering angle of a steering wheel, a multiplying means for multiplying the steering angle detected by the steering angle sensor by the vehicle speed detected by the vehicle speed detecting means and by a given constant, a dividing means for dividing a gravitational acceleration by the vehicle speed detected by the vehicle speed detecting means, a low-select means for selecting a lower one of outputs from the multiplying means and the dividing means, and an abnormality determining means for determining that a yaw rate sensor is abnormal when a yaw rate detected by the yaw rate sensor exceeds a value selected by the low-select means.

When the steering angle detected by the steering angle sensor is represented by δ, and a constant is represented by k, the radius of turning of the vehicle is capable of being presumed with $\{1/(\delta \cdot k)\}$, until the centripetal acceleration becomes a limit value. If (V/R) in FIG. 3 is replaced by (δ·V·k), the range of yaw rate γ capable of being actually produced can be determined more precisely than an obliquely-lined range shown in FIG. 3. Therefore, when the yaw rate γ is in a range which exceeds a lower one of a value (δ·V·k) obtained by multiplying the steering angle δ by the vehicle speed V and the given constant k and a value (G/V) obtained by dividing the gravitational acceleration G by the vehicle speed, i.e., which exceeds $\min\{(\delta \cdot V \cdot k), (G/V)\}$, the side-slip of the vehicle is nearly "0" in a normal traveling state. Therefore, the abnormality of the yaw rate sensor, including the state in which the neutral point is normal, but the sensitivity is abnormal, can be detected with a good accuracy, irrespective of the situation of a road surface traveled.

To achieve the first object, there is also provided a system for detecting an abnormality of a yaw rate sensor, comprising a vehicle speed detecting means for detecting a vehicle speed of a vehicle, a lateral acceleration sensor for detecting a lateral acceleration of the vehicle, a dividing means for dividing the vehicle speed detected by the vehicle speed detecting means by a minimum turning radius of the vehicle, a dividing means for dividing the lateral acceleration detected by the lateral acceleration sensor by the vehicle speed detected by the vehicle speed detecting means, a low-select means for selecting a lower one of outputs from both of the dividing means, and an abnormality determining means for determining that a yaw rate sensor is abnormal when a yaw rate detected by the yaw rate sensor exceeds the value selected by the low-select means.

When the lateral acceleration detected by the lateral acceleration sensor is represented by $\alpha$, the range of yaw rate capable of being actually produced can be determined more precisely than the obliquely lined range shown in FIG. 3 by replacing (G/V) in FIG. 3 by ($\alpha$/V). Therefore, when the yaw rate $\gamma$ is in a range which exceeds lower one of a value (V/R) obtained by dividing the vehicle speed V by the minimum radius of turning of the vehicle and a value ($\alpha$/V) obtained by dividing the lateral acceleration $\alpha$ by the vehicle speed V, i.e., which exceeds min{(V/R), ($\alpha$/V)}, the side-slip of the vehicle is nearly "0" in a usual traveling state. Thus, the abnormality of the yaw rate sensor, including the state in which the neutral point is normal, but the sensitivity is abnormal, can be detected with a good accuracy, irrespective of the situation of a road surface traveled.

To achieve the first object, there is also provided a system for detecting an abnormality of a yaw rate sensor, comprising a vehicle speed detecting means for detecting a vehicle speed of a vehicle, a steering angle sensor for detecting a steering angle of a steering wheel, a lateral acceleration sensor for detecting a lateral acceleration of the vehicle, a multiplying means for multiplying the steering angle detected by the steering angle sensor by the vehicle speed detected by the vehicle speed detecting means and by a given constant, a dividing means for dividing the lateral acceleration detected by the lateral acceleration sensor by the vehicle speed detected by the vehicle speed detecting means, a low-select means for selecting a lower one of outputs from the multiplying means and the dividing means, and an abnormality determining means for determining that a yaw rate sensor is abnormal when a yaw rate detected by the yaw rate sensor exceeds the value selected by the low-select means.

When the steering angle detected by the steering angle sensor is represented by $\delta$, and a constant is represented by k, the radius of turning of the vehicle is capable of being presumed with {1/($\delta$·k)}, until the centripetal acceleration becomes a limit value. By replacing (V/R) in FIG. 3 by ($\delta$·V·k), the range of yaw rate $\gamma$ capable of being actually produced can be determined more precisely than the obliquely-lined range shown in FIG. 3. When the lateral acceleration detected by the lateral acceleration sensor is represented by $\alpha$, the range of yaw rate capable of actually being produced can be determined more precisely than the obliquely-lined range shown in FIG. 3 by replacing (G/R) in FIG. 3 by ($\alpha$/V). Therefore, when the yaw rate $\gamma$ is in a range which exceeds a lower one of a value ($\delta$·V·k) obtained by multiplying the steering angle $\delta$ by the vehicle speed V and the given constant k and a value ($\alpha$/V) obtained by dividing the lateral acceleration $\alpha$ by the vehicle speed V, i.e., which exceeds min{($\delta$·V·k), ($\alpha$/V)}, the side slip of the vehicle is nearly "0" in a normal traveling state. Thus, the abnormality of the yaw rate sensor, including the state in which the neutral point is normal, but the sensitivity is abnormal, can be detected with a good accuracy, irrespective of the situation of a road surface traveled.

To achieve the second object, there is provided a system for detecting an abnormality of a lateral acceleration sensor, comprising a vehicle speed detecting means for detecting a vehicle speed of a vehicle, a dividing means for dividing a squared value of the vehicle speed detected by the vehicle speed detecting means by a minimum turning radius of the vehicle, a low-select means for selecting lower one of an output from the dividing means and a gravitational acceleration, and an abnormality determining means for determining that the lateral acceleration sensor is abnormal when the lateral acceleration detected by the lateral acceleration sensor exceeds a value selected by the low-select means.

When the yaw rate is represented by $\gamma$; the lateral acceleration is represented by $\alpha$, and the vehicle speed is by V, a relation $\gamma$=($\alpha$/V) is established in a range of smaller side slip. If the obliquely-lined range of yaw rate $\gamma$ show n in FIG. 3, i.e., min{(V/R), (G/V)} is replaced by the lateral acceleration $\alpha$, a relation, $\alpha \leq$min{(V$^2$/R), G} is given. Therefore, the lateral acceleration $\alpha$ capable of being actually produced must be in a range of $\alpha \leq$min{(V$^2$/R), G}. When the lateral acceleration $\alpha$ is in a range which exceeds lower one of a value (V$^2$/R) obtained by dividing a squared value of the vehicle speed V and a gravitational acceleration G, i.e., which exceeds min{(V$^2$/R), G}, the side slip of the vehicle is nearly "0" in a normal traveling state. Thus, the abnormality of the yaw rate sensor, including the state in which the neutral point is normal, but the sensitivity is abnormal, can be detected with good accuracy, irrespective of the situation of a road surface traveled.

To achieve the second object, there is also provided a system for detecting an abnormality of a lateral acceleration sensor, comprising a vehicle speed detecting means for detecting a vehicle speed of a vehicle, a steering angle sensor for detecting a steering angle of a steering wheel, a multiplying means for multiplying the steering angle detected by the steering angle sensor by a squared value of the vehicle speed detected by the vehicle speed detecting means and by a given constant, a low-select means for selecting lower one of an output from the multiplying means and a gravitational acceleration, and an abnormality determining means for determining that the lateral acceleration sensor is abnormal when a lateral acceleration detected by the lateral acceleration sensor exceeds a value selected by the low-select means.

When the steering angle detected by the steering angle sensor is represented by $\delta$, and a constant is by k, the turning radius of the vehicle is capable of being presumed with {1/($\delta$·k)}, until the centripetal acceleration becomes a limit value. By ensuring that the range of yaw rate capable of being actually produced is in a range of $\gamma \leq$min{($\delta$·V·k), (G/V)} by replacing (V/R) in FIG. 3 by ($\delta$·V·k), the range of yaw rate capable of being actually produced can be determined more precisely than the obliquely-lined range shown in FIG. 3. Moreover, when the yaw rate is represented by $\gamma$; the lateral acceleration is represented by $\alpha$, and the vehicle speed is represented by V, a relation, $\gamma$=($\alpha$/V) is established in a range of smaller side-slip. If the rane of yaw rate $\gamma$ determined by $\gamma \leq$min{($\delta$·V·k), (G/V)} is replaced by the lateral acceleration $\alpha$, a relation, $\alpha \leq$min{($\delta$·V·k), (G/V)} is given. Therefore, when the lateral acceleration $\alpha$ is in a range which exceeds a lower one of a value obtained by multiplying the steering angle $\delta$ by a squared value (V$^2$) of the vehicle and the given constant k and a gravitational acceleration G, i.e., which exceeds min{($\delta$·V$^2$·k), G}, the side-slip of the vehicle is nearly "0" in a normal traveling state of the vehicle. Thus, the abnormality of the yaw rate sensor, including the state in which the neutral point is normal, but the sensitivity is abnormal, can be detected with high accuracy, irrespective of the situation of a road surface traveled.

In addition, the abnormality determining means determines that the lateral acceleration sensor is abnormal when a lateral acceleration detected by the lateral acceleration sensor exceeds the output from the low-select means, both of when the vehicle is being turned leftwards and rightwards.

An offset value component corresponding to the sloping of a road surface is included in the value detected by the lateral acceleration sensor. If the output from the low-select means is compared only with the value detected by the lateral acceleration sensor there is a possibility that the erroneous-determination may be made due to the value detected by the lateral acceleration sensor and including the offset value component. However, it is determined that the lateral acceleration sensor is abnormal when the abnormality determining means determines the abnormality, both of when the vehicle is being turned leftwards and rightwards. Therefore, the erroneous-determination due to the sloping of the road surface can be avoided, whereby the abnormality of the lateral acceleration sensor can be determined with good accuracy.

BRIEF DESCRIPTION OF THE DRAWINGS

FIG. 4 is a block diagram similar to FIG. 2, but according to a second embodiment of the present invention.

FIG. 5 is a block diagram similar to FIG. 2, but according to a third embodiment of the present invention.

FIG. 6 is a block diagram similar to FIG. 2, but according to a fourth embodiment of the present invention.

FIG. 7 is a block diagram similar to FIG. 2, but according to a fifth embodiment of the present invention.

FIG. 8 is a flow chart showing a procedure for determining an abnormality of a lateral acceleration sensor.

DETAILED DESCRIPTION OF THE PREFERRED EMBODIMENTS

The present invention will now be described by way of embodiments shown in the accompanying drawings.

Figure 1:
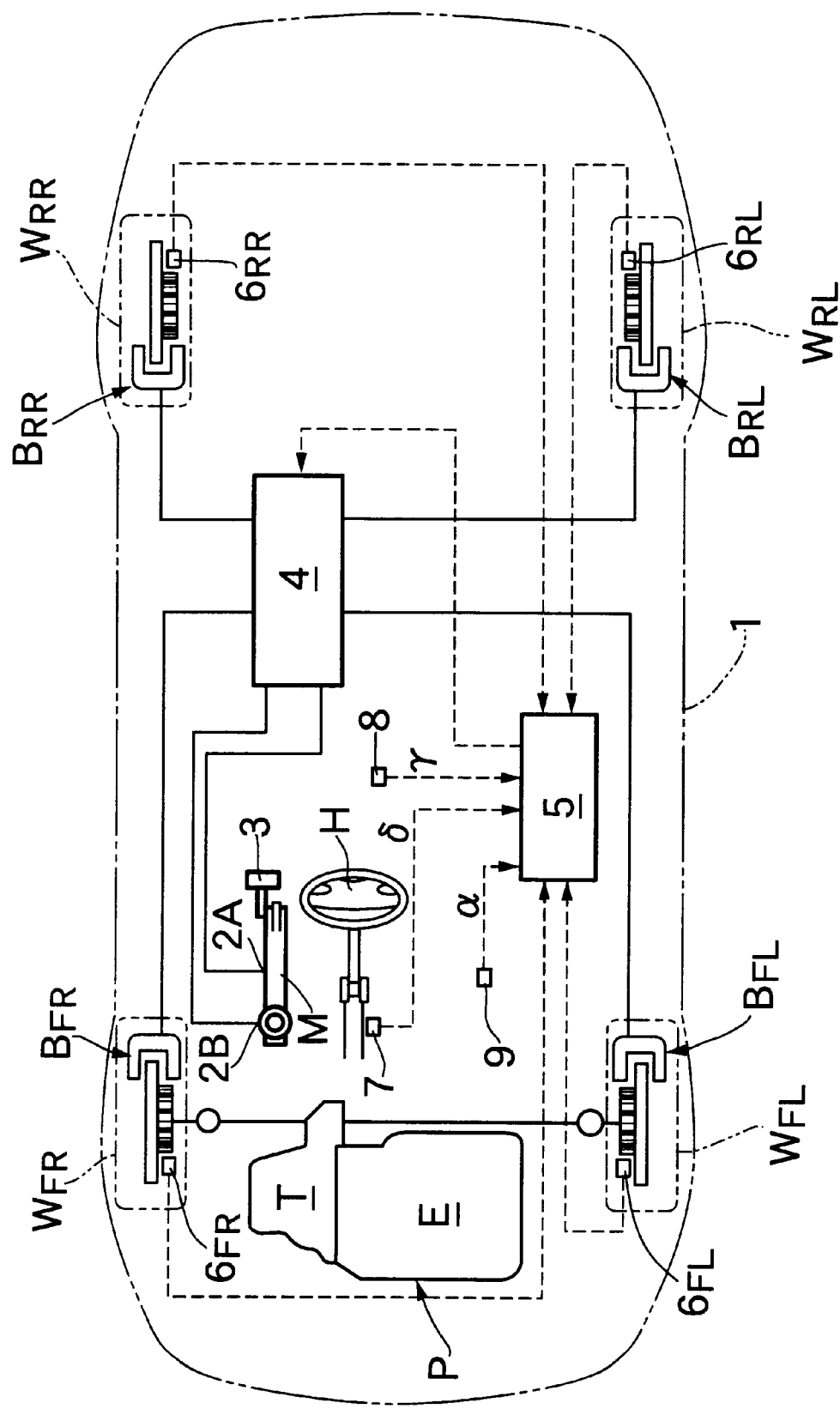
FIG. 1 is a diagram showing a driving system and a brake system of a vehicle according to a first embodiment of the present invention.
Figure 2:
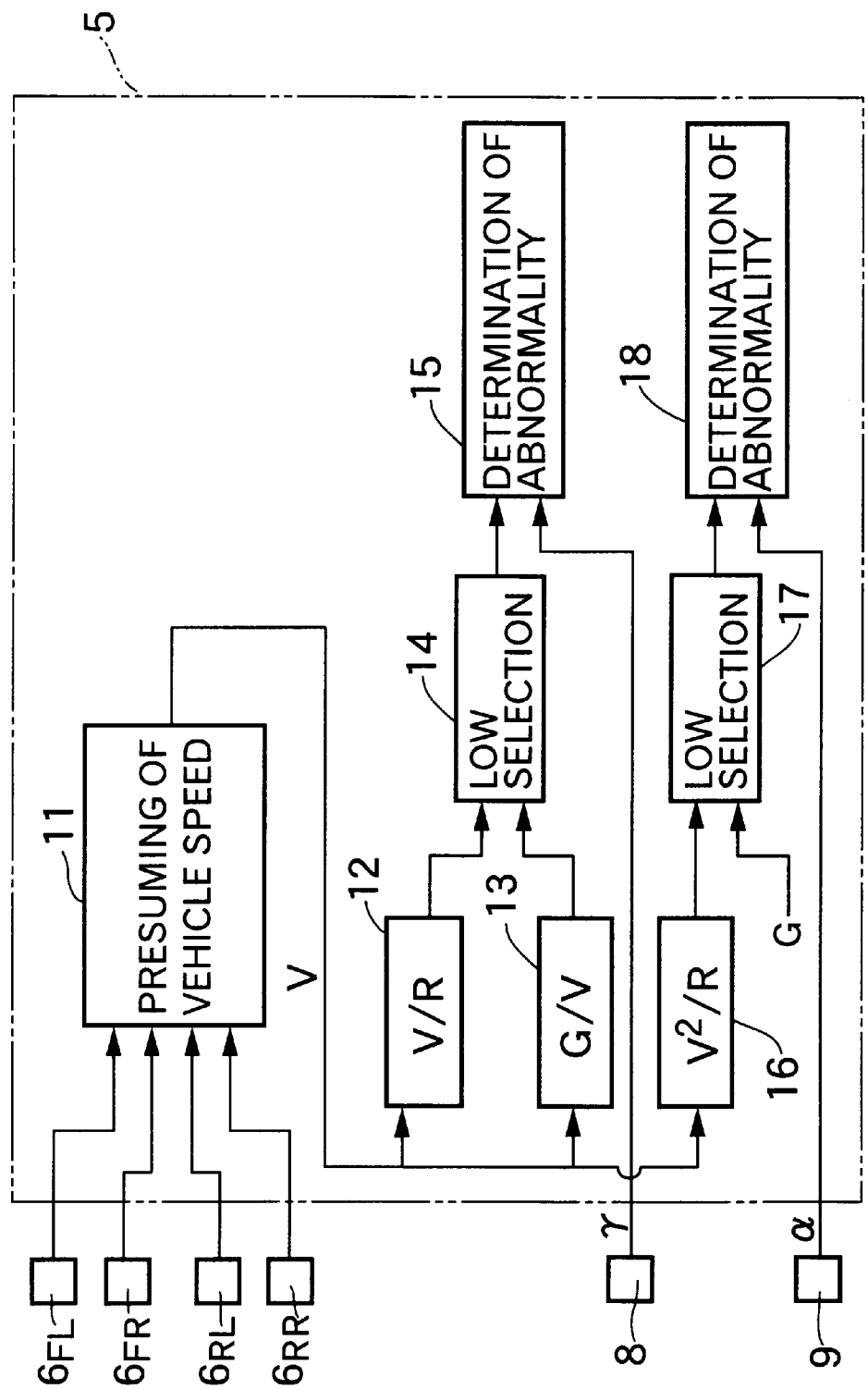
FIG. 2 is a block diagram of an arrangement for determining abnormalities of a yaw rate sensor and a lateral acceleration sensor, which is extracted from a control unit.
Figure 3:
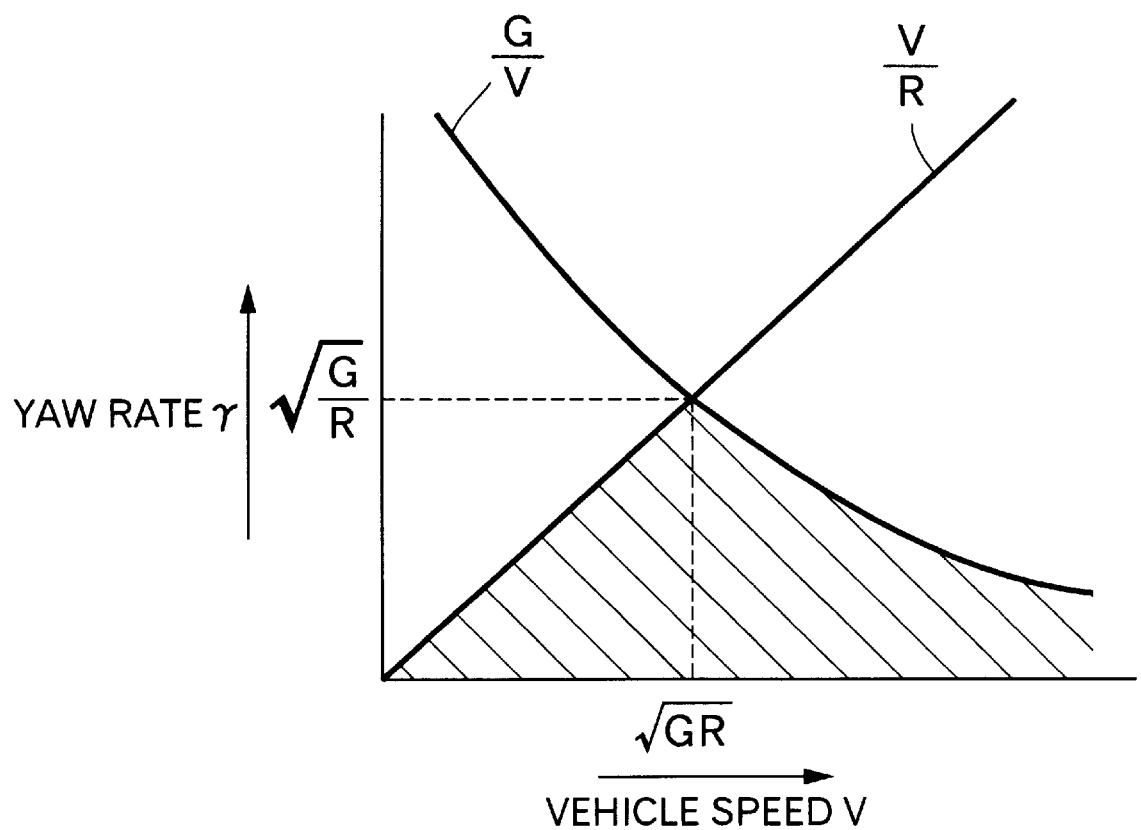
FIG. 3 is a diagram showing a range of yaw rate which is capable of actually being generated.

FIGS. 1 to 3 show a first embodiment of the present invention. FIG. 1 is a diagram showing a driving system and a brake system of a vehicle; FIG. 2 is a block diagram of an arrangement for determining an abnormality of a yaw rate sensor and a lateral acceleration sensor, which is extracted from a control unit; and FIG. 3 is a diagram showing a range of yaw rate which is capable of being actually generated.

Referring first to FIG. 1, the vehicle is a front engine, front drive vehicle. A power unit P comprising an engine E and a transmission T is mounted at a front portion of a vehicle body 1 to drive a left front wheel $W_{FL}$ and a right front wheel $W_{FR}$ which are driving wheels. Left and right front wheel brakes $B_{FL}$ and $B_{FR}$ are mounted on the left and right front wheels $W_{FL}$ and $W_{FR}$, respectively, and left and right rear wheel brakes $B_{RL}$ and $B_{RR}$ are mounted on left and right rear wheels $W_{RL}$ and $W_{RR}$ which are follower wheels, respectively. Each of the wheel brakes $B_{FL}$, $B_{FR}$, $B_{RL}$ and $B_{RR}$ is, for example, a disc brake.

A braking liquid pressure corresponding to an operation of depression of a brake pedal 3 is outputted from first and second output ports 2A and 2B provided in a tandem-type master cylinder M. The first and second output ports 2A and 2B are connected to a braking liquid pressure control device 4 as a vehicle motion regulating means, so that the braking liquid pressure from the braking liquid pressure control device 4 is applied to the wheel brakes $B_{FL}$, $B_{FR}$, $B_{RL}$ and $B_{RR}$. In the braking liquid pressure control device 4, the braking fluid pressure applied to the wheel brakes $B_{FL}$, $B_{FR}$, $B_{RL}$ and $B_{RR}$ is controlled by a control unit 5. Inputted to the control unit 5 are detection values which are detected by wheel speed sensors $6_{FL}$, $6_{FR}$, $6_{RL}$ and $6_{RR}$ for detecting wheel speeds of the wheels $W_{FL}$, $W_{FR}$, $W_{RL}$ and $W_{RR}$, respectively, a steering angle sensor 7 for detecting a steering angle $\delta s$ resulting from the operation of a steering wheel H, a yaw rate sensor 8 for detecting a yaw rate $\gamma$ of the vehicle, and a lateral acceleration sensor 9 for detecting a lateral acceleration $\alpha$ of the vehicle.

The control unit 5 is capable of carrying out (1) an antilock brake control for controlling the braking liquid pressures for the wheel brakes $B_{FL}$, $B_{FR}$, $B_{RL}$ and $B_{RR}$ to eliminate the locking of the wheels during a braking operation; (2) a traction control for controlling the braking liquid pressures for the left and right front wheel brakes $B_{FL}$ and $B_{FR}$, which are mounted on the left and right front wheels $W_{FL}$ and $W_{FR}$, which are driving wheels, thereby inhibiting the generation of excessive slipping of the left and right front wheels $W_{FL}$ and $W_{FR}$ during non-braking operation; and (3) a directional stability control for controlling the braking liquid pressures for the left and right front wheel brakes $B_{FL}$ and $B_{FR}$ irrespective of whether during the braking and non-braking operations to control the yaw motion of the vehicle. For example, in the control unit 5, for each of the antilock brake control, the traction control and the directional stability control, a reference speed is determined for at least one of the driving wheels $W_{FL}$ and $W_{FR}$ and the follower wheels $W_{RL}$ and $W_{RR}$; and a control quantity is calculated based on a deviation between the actual wheel speed of at least one of the driving wheels $W_{FL}$ and $W_{FR}$ and the follower wheels $W_{RL}$ and $W_{RR}$ and the reference speed, and the operation of the braking liquid pressure control device 4 is controlled based on the control quantity. In this case, the reference value is corrected based on at least one of the yaw rate $\gamma$ and the lateral acceleration $\alpha$. For example, in the traction control, the reference value is corrected to be decreased when at least one of the yaw rate $\gamma$ and the lateral acceleration $\alpha$ is larger.

The braking liquid pressure control device 4 and a means for regulating the output from the engine E may be used as a motion regulating means for varying the motion of the vehicle, or a means for regulating the output from the engine E may be used in place of the braking liquid pressure control device 4.

The control unit 5 also has a function for detecting an abnormality of the yaw rate sensor 8 and the lateral acceleration sensor 9. To detect the abnormality of the yaw rate sensor 8 and the lateral acceleration sensor 9, as shown in FIG. 2, the control unit 5 includes a vehicle speed presuming means 11 as a vehicle speed detecting means, a first dividing means 12, a second dividing means 13, a low-select means 14 for selecting lower one of outputs from the first and second dividing means 12 and 13, a yaw rate sensor abnormality determining means 15 for determining the abnormality of the yaw rate sensor 8 based on the output from the low-select means 14 and the yaw rate $\gamma$ detected by the yaw rate sensor 8, a third dividing means 16, a low-select means 17 for selecting a lower one of an output from the third dividing means 16 and a gravitational acceleration G, and a lateral acceleration sensor abnormality determining means 18 for determining the abnormality of the lateral acceleration sensor 9 based on an output from the low-select means 17 and the lateral acceleration $\alpha$ detected by the lateral acceleration sensor 9.

The vehicle speed presuming means, 11 presumes a vehicle speed V based on the wheel speeds of at least the left and right follower wheels, i.e., the left and right rear wheels $W_{RL}$ and $W_{RR}$. In this embodiment, a vehicle speed V based on the wheel speeds detected by the wheel speed sensors $6_{FL}$, $6_{FR}$, $6_{RL}$ and $6_{RR}$ is calculated in the vehicle speed presuming means 11, and the vehicle speed V obtained in the vehicle speed presuming means 11 is inputted to the first, second and third dividing means 12, 13 and 16.

The first dividing means 12 carries out the calculation of dividing the vehicle speed V by the minimum turning radius R of the vehicle, and the second dividing means 13 carries out the calculation of dividing the gravitational acceleration G by the vehicle speed V. A value (V/R) obtained in the first dividing means 12 and a value (G/V) obtained in the second dividing means 13 are inputted to the low-select means 14, and a lower one of the values (V/R) and (G/V) is selected by the low-select means 14 and inputted to the yaw rate sensor abnormality determining means 15. A yaw rate γ detected by the yaw rate sensor 8 is also inputted to the yaw rate sensor abnormality determining means 15.

In the yaw rate sensor abnormality determining means 15, the value selected by the low-select means 14, i.e., min {(V/R), (G/V)} and the yaw rate γ are compared with one another. If γ>min {(V/R), (G/V)}, then the yaw rate sensor abnormality determining means 15 determines that the yaw rate sensor 8 is abnormal, thereby outputting a signal indicative of the fact that the yaw rate sensor 8 is abnormal.

The third dividing means 16 carries out the calculation of dividing a squared value ($V^2$) of the vehicle speed V by the minimum turning radius R of the vehicle. A value ($V^2$/R) obtained in the third dividing means 16 and the gravitational acceleration G are inputted to the low-select means 17. The low-select means 17 selects a lower one of the value ($V_2$/R) obtained in the third dividing means 16 and the gravitational acceleration G, and the value obtained in the low-select means 17, i.e., min{($V^2$/R), G} is inputted to the lateral acceleration sensor abnormality determining means 18. A lateral acceleration α detected by the lateral acceleration sensor 9 is also inputted to the lateral acceleration sensor abnormality determining means 18. In the lateral acceleration sensor abnormality determining means 18, the value min{($V^2$), G} obtained in the low-select means 17 and the lateral acceleration α detected by the lateral acceleration sensor 9 are compared with each other. If α>min{($V^2$), G}, then the lateral acceleration sensor abnormality determining means 18 determines that the lateral acceleration sensor 9 is abnormal, thereby outputting a signal indicative of the fact that the lateral acceleration sensor 9 is abnormal.

The operation of the first embodiment will be described below. When there is no side-slipping of the vehicle, the yaw rate γ of the vehicle must be within an obliquely-lined range shown in FIG. 3, depending upon a limit value of centripetal acceleration of the vehicle, i.e., the gravitational acceleration G of the vehicle and a lower limit value of the radius of turning of the vehicle, i.e., the minimum turning radius R, and thus, a relation, γ≦min{(V/R), (G/V)} must be established. If γ>min{(V/R), (G/V)}, the yaw rate sensor 8 outputs a value which cannot be intrinsically produced. Moreover, the side-slip of the vehicle is nearly "zero" in a normal traveling state and hence, the abnormality of the yaw rate sensor 8 including a state in which a neutral point is normal, but the sensitivity is abnormal, can be detected with a good accuracy, irrespective of the situation of a road surface traveled.

In a range of a small side-slip, γ=(α/V) is established. When the obliquely-lined range shown in FIG. 3, i.e., γ≦min{(V/R), (G/V)}, is replaced by the lateral acceleration α, a relation, α≦min{($V^2$/R), G} is given. Therefore, the lateral acceleration α capable of being generated in the vehicle must be in a range of α≦min{($V^2$/R), G}. When α>min{($V^2$/R), G}, the lateral acceleration sensor 9 outputs a value which cannot be intrinsically produced. Thus, the abnormality of the lateral acceleration sensor 9 including a state in which a neutral point is normal, but the sensitivity is abnormal, can be detected with good accuracy, irrespective of the situation of a road surface traveled.

FIG. 4 shows a second embodiment of the present invention, wherein portions or components corresponding to those in the first embodiment are designated by like reference characters.

To detect the abnormality of the yaw rate sensor 8 and the lateral acceleration sensor 9, the control unit 5 includes a vehicle speed presuming means 11, a multiplying means 19, a dividing means 13, a low-select means 20 for selecting a lower one of outputs from the multiplying means 19 and the dividing means 13, a yaw rate sensor abnormality determining means 21 for determining the abnormality of the yaw rate sensor 8 based on an output from the low-select means 20 and a yaw rate detected by the yaw rate sensor 8, a dividing means 16, a low-select means 17 for selecting a lower one of an output from the dividing means 16 and the gravitational acceleration G, and a lateral acceleration sensor abnormality determining means 18 for determining the abnormality of the lateral acceleration sensor 9 based on an output from the low-select means 17 and the lateral acceleration α detected by the lateral acceleration sensor 9.

The steering angle δ detected by the steering angle sensor 7 and the vehicle speed V obtained in the vehicle speed presuming means 11 are inputted to the multiplying means 19. The multiplying means 19 carries out the calculation of multiplying the steering angle δ by the vehicle speed V and a given constant k, and the low-select means 20 selects a lower one of a value (δ·V·k) obtained in the multiplying means 19 and a value (G/V) obtained in the dividing means 13, and inputs such lower one to the yaw rate sensor abnormality determining means 21. In the yaw rate sensor abnormality determining means 21, the value outputted from the low-select means 20, i.e., min{(δ·V·k), (G/V)} and the yaw rate γ detected by the yaw rate sensor 8 are compared with each other. If γ>min{(δ·V·k), (G/V)}, then the yaw rate sensor abnormality determining means 21 determines that the yaw rate sensor 8 is abnormal, thereby outputting a signal indicative of the fact that the yaw rate sensor 8 is abnormal.

The turning radius of the vehicle is capable of being presumed with {1/(γk)}, until the centripetal acceleration becomes a limit value. A range of yaw rate γ capable of being actually produced can be determined more precisely than the obliquely-lined range shown in FIG. 3 by replacing (V/R) in FIG. 3 by (δ·V·k). Therefore, in the second embodiment in which, when γ>min{(δ·V·k), (G/V)}, it is determined that the yaw rate sensor 8 is abnormal, the abnormality of the yaw rate sensor 8 can be detected with greater accuracy.

FIG. 5 shows a third embodiment of the present invention, where portions or components corresponding to those in each of the above-described embodiments are designated by like reference characters.

To detect the abnormality of the yaw rate sensor 8 and the lateral acceleration sensor 9, the control unit 5 includes a vehicle speed presuming means 11, dividing means 12 and 22, a low-select means 23 for selecting lower one of outputs from both the dividing means 12 and 22, a yaw rate sensor abnormality determining means 24 for determining the abnormality of the yaw rate sensor 8 based on an output from the low-select means 23 and a yaw rate δ detected by the yaw rate sensor 8, a dividing means 16, a low-select means 17 for selecting lower one of an output from the dividing means 16 and the gravitational acceleration G, and a lateral acceleration sensor abnormality determining means 18 for determining the abnormality of the lateral acceleration sensor 9 based on an output from the low-select means 17 and the lateral acceleration α detected by the lateral acceleration sensor 9.

The vehicle speed V obtained in the vehicle speed presuming means 12 and the lateral acceleration α detected by the lateral acceleration sensor 9 are inputted to the dividing means 22. The dividing means 22 carries out the calculation of dividing the lateral acceleration α by the vehicle speed V. The low-select means 23 selects a lower one of a value (V/R) obtained in one of the dividing means 12 and a value (α/V) obtained in the other dividing means 22, and inputs such lower one to the yaw rate sensor abnormality determining means 24. In the yaw rate sensor abnormality determining means 24, a value outputted from the low-select means 23, i.e., min{(V/R), (α/V)} and the yaw rate γ detected by the yaw rate sensor 8 are compared with each other. If γ>min{(V/R), (α/V)}, the yaw rate sensor abnormality determining means 24 determines that the yaw rate sensor 8 is abnormal, thereby outputting a signal indicative of the fact that the yaw rate sensor 8 is abnormal.

In the obliquely-lined range shown in FIG. 3, (G/R) is based on the limit value of the lateral acceleration α and hence, a range of yaw rate γ capable of being actually produced can be determined more precisely than the obliquely-lined range shown in FIG. 3. Therefore, in the third embodiment in which when γ>min{(V/R), (α/V)}, it is determined that the yaw rate sensor 8 is abnormal, the abnormality of the yaw rate sensor 8 can be detected with greater accuracy.

FIG. 6 show a fourth embodiment of the present invention, wherein portions or components corresponding to those in each of the above-described embodiments are designated by like reference characters.

To detect the abnormality of the yaw rate sensor 8 and the lateral acceleration sensor 9, the control unit 5 includes a vehicle speed presuming means 11, a multiplying means 19, a dividing means 22, a low-select means 25 for selecting lower one of outputs from the multiplying means 19 and the dividing means 22, a yaw rate sensor abnormality determining means 26 for determining the abnormality of the yaw rate sensor 8 based on an output from the low-select means 25 and a yaw rate γ detected by the yaw rate sensor 8, a dividing means 16, a low-select means 17 for selecting lower one of an output from the dividing means 16 and the gravitational acceleration G, and a lateral acceleration sensor abnormality determining means 18 for determining the abnormality of the lateral acceleration sensor 9 based on an output from the low-select means 17 and the lateral acceleration α detected by the lateral acceleration sensor 9.

In the yaw rate sensor abnormality determining means 26, a value outputted from the low-select means 25, i.e., min{(δ·V·k), (α/V)} and the yaw rate γ detected by the yaw rate sensor 8 are compared with each other. If γ>min{(δ·V·k), (α/V)}, the yaw rate sensor abnormality determining means 26 determines that the yaw rate sensor 8 is abnormal, thereby outputting a signal indicative of the fact that the yaw rate sensor 8 is abnormal.

By replacing (V/R) in FIG. 3 by (δ·V·k) as described in the second and third embodiments, a range of γ capable of actually being produced can be determined more precisely. Therefore, in the fourth embodiment in which when γ>min{(δ·V·k), (α/V)}, it is determined that the yaw rate sensor 8 is abnormal, the accuracy of the detection of the abnormality of the yaw rate sensor 8 is further enhanced.

FIGS. 7 and 8 show a fifth embodiment of the present invention, wherein portions or components corresponding to those in each of the above-described embodiments are designated by like reference characters.

To detect the abnormality of the yaw rate sensor 8 and the lateral acceleration sensor 9, the control unit 5 includes a vehicle speed presuming means 11, a multiplying means 19, a dividing means 22, a low-select means 25 for selecting lower one of outputs from the multiplying means 19 and the dividing means 22, a yaw rate sensor abnormality determining means 26 for determining the abnormality of the yaw rate sensor 8 based on an output from the low-select means 25 and a yaw rate γ detected by the yaw rate sensor 8, a multiplying means 27, a low-select means 28 for selecting a lower one of an output from the multiplying means 27 and the gravitational acceleration G, and a lateral acceleration sensor abnormality determining means 29 for determining the abnormality of the lateral acceleration sensor 9 based on an output from the low-select means 28 and the lateral acceleration α detected by the lateral acceleration sensor 9.

The vehicle speed V obtained in the vehicle speed presuming means 11 and the steering angle δ detected by the steering angle sensor 7 are inputted to the multiplying means 27. In the multiplying means 27, the calculation of multiplying the steering angle δ by a squared value ($V^2$) of the vehicle speed V and a given constant k is carried out. The low-select means 28 selects a lower one of a value (δ·$V^2$·k) obtained in the multiplying means 27 and the gravitational acceleration G, and inputs such lower one to the lateral acceleration sensor abnormality determining means 29.

In the lateral acceleration sensor abnormality determining means 29, the abnormality of the lateral acceleration sensor 9 is determined in a procedure as shown in FIG. 8. At Step S1, it is determined whether the lateral acceleration α is greater than zero. Here, α>0 indicates a state in which the vehicle is being turned rightwards; α<0 indicates a state in which the vehicle is being turned leftwards, and α=0 indicates the state in which at a state in which the vehicle is traveling straight. If it is determined at Step S1 that α>0, i.e., when the vehicle is being turned rightwards, the process is advanced from Step S1 to Step S2.

At Step S2, it is determined whether the lateral acceleration α is greater than the output min{(δ·$V^2$·k), G} from the low-select means 28. If it is determined at Step S2 that α>min{(δ·$V^2$·k), G}, a right abnormality flag is set at "1" at Step S3. Namely, it is determined that lateral acceleration sensor 9 is abnormal, when the vehicle is being turned rightwards.

At Step S4, it is determined whether a left abnormality flag is at "1". If the left abnormality flag is at "1", it is determined at Step S5 that the lateral acceleration sensor 9 is abnormal.

If it is determined at Step S1 that α≦0, i.e., it is determined that the vehicle is being turned leftwards, or is traveling straight, the process is advanced from Step S1 to Step S6, at which it is determined whether the lateral acceleration α is less than a value [−min{(δ·$V^2$·k), G}] obtained by adding a minus sign to the output from the low-select means 28. If it is determined that <−min{(δ·$V^2$·k), G}, the left abnormality flag is set at "1" at Step S7. Namely, it is determined that the lateral acceleration sensor 9 is abnormal, when the vehicle is being turned leftwards.

At Step S8, it is determined whether the right abnormality flag is at "1". If the right abnormality flag is at "1", it is determined at Step S5 that the lateral acceleration sensor 9 is abnormal.

In any of the following cases: (1) when it is determined at Step S2 that $\alpha \leq \min\{(\delta \cdot V^2 \cdot k), G\}$; (2) when it is determined at Step S4 that the left abnormality flag is at "0"; (3) when it is determined at Step S6 that $\alpha \geq -\min\{(\delta \cdot V^2 \cdot k), G\}$; (4) when it is determined at Step S8 that the right abnormality flag is at "0"; and (5) after it is determined at Step S5 that the lateral acceleration sensor 9 is abnormal, the process is advanced to Step S9. When it is confirmed at Step S9 that a given time has elapsed, both of the left and right flags are reset at Step S10.

According to such abnormality determining process shown in FIG. 8, when the lateral acceleration α exceeds the output $\min\{(\delta \cdot V^2 \cdot k), G\}$ from the low-select means 28 in either of the left and right directions, it is determined in the lateral acceleration sensor abnormality determining means 29 that the lateral acceleration sensor 9 is abnormal.

By replacing (V/R) in FIG. 3 by (δ·V·k) as described in the second embodiment, a range of yaw rate γ capable of being actually produced can be determined more precisely than the obliquely-lined range shown in FIG. 3. In a range of smaller side-slip, a relation, $\gamma = (\alpha/V)$ is established. Therefore, if the range of yaw rate γ determined according to $\gamma \leq \min\{(\delta \cdot V \cdot k), (G/V)\}$ is replaced by the lateral acceleration α, a relation, $\alpha \leq \min\{(\delta \cdot V^2 \cdot k), G\}$, is given. Therefore, in the fifth embodiment in which when the lateral acceleration α is greater than $\min\{(\delta \cdot V^2 \cdot k), G\}$, it is determined that the lateral acceleration sensor 9 is abnormal, the accuracy of the detection of the abnormality of the lateral acceleration sensor 9 is enhanced. Moreover, an offset value component corresponding to an inclination of a road surface is included in the value obtained in the lateral acceleration sensor 9. However, only when the lateral acceleration sensor abnormality determining means 29 determines that the lateral acceleration sensor 9 is abnormal, both of when the vehicle is being turned leftwards and rightwards, the lateral acceleration sensor abnormality determining means 29 determines that the lateral acceleration sensor 9 is abnormal. Therefore, the erroneous determination due to the sloping of the road surface can be avoided, whereby abnormality of the lateral acceleration sensor 9 can be detected with greater accuracy.

Although the embodiments of the present invention have been described in detail, it will be understood that the present invention is not limited to the above-described embodiments, and various modifications may be made without departing from the subject matter of the present invention defined in claims.

What is claimed:

1. A system for detecting an abnormality of a yaw rate sensor, comprising:
    a vehicle speed detecting means for detecting a vehicle speed of a vehicle;
    a first dividing means for dividing the vehicle speed detected by said vehicle speed detecting means by a minimum turning radius of the vehicle;
    a second dividing means for dividing a gravitational acceleration by the vehicle speed detected by said vehicle speed detecting means;
    a low-select means for selecting a lower one of outputs from both of said first and second dividing means; and
    an abnormality determining means for determining that a yaw rate sensor is abnormal when a yaw rate detected by said yaw rate sensor exceeds a value selected by said low-select means.

* * * * *